March 7, 1950  H. O. MORRISON  2,499,521
POT WELL SCRAPER
Filed June 8, 1946
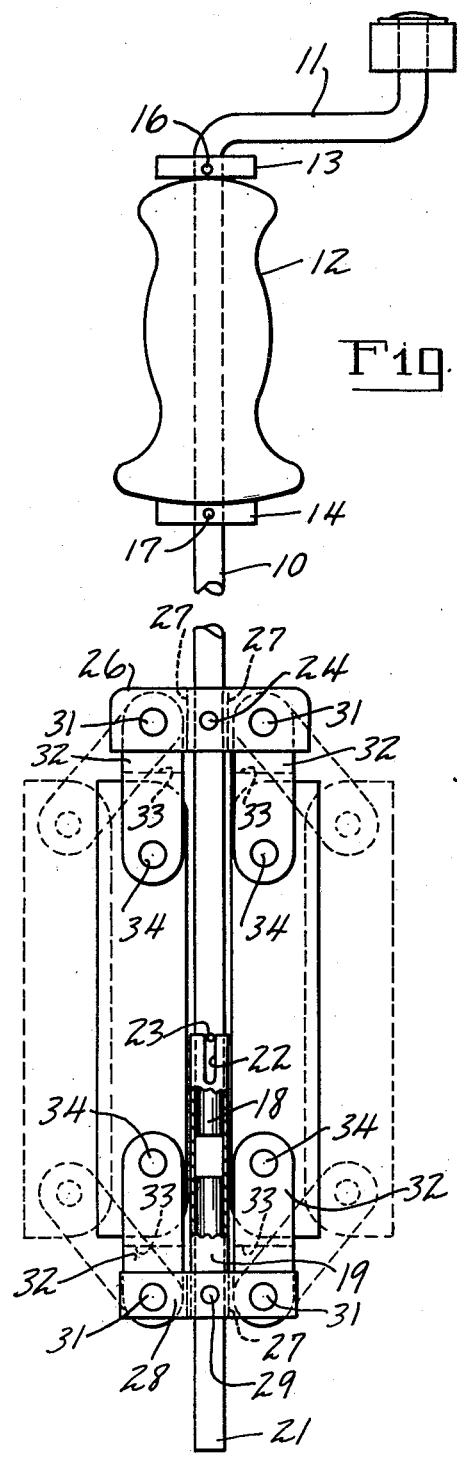
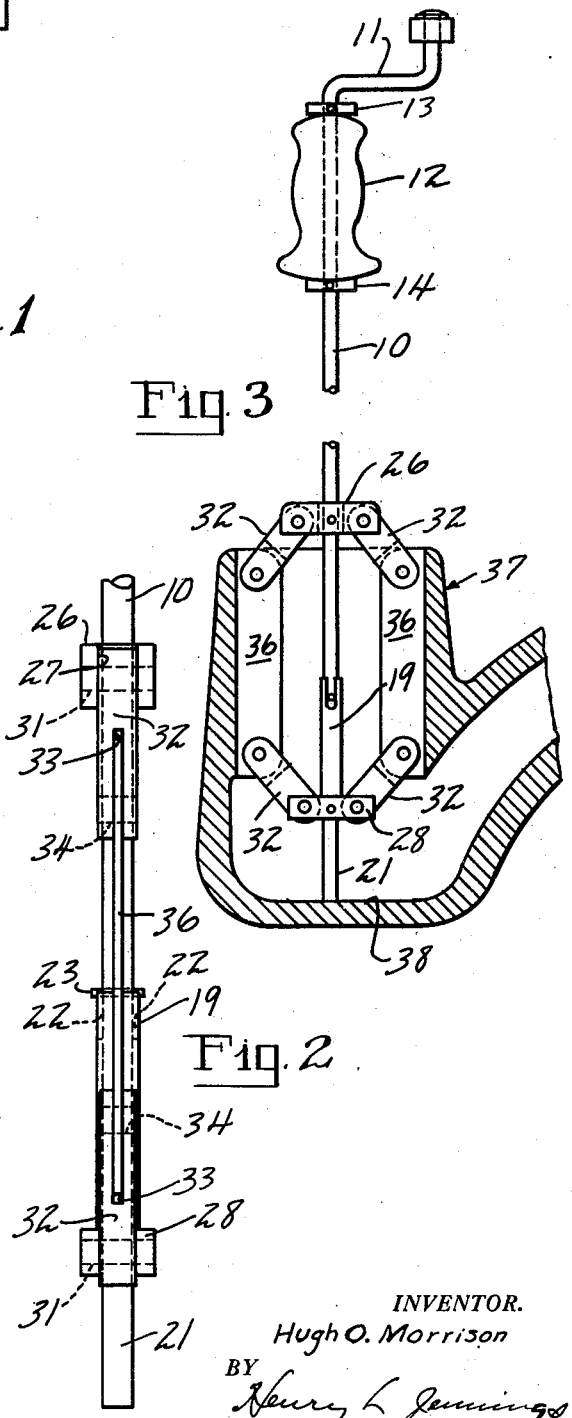
INVENTOR.
Hugh O. Morrison
BY Henry L. Jennings
ATTORNEY Patented Mar. 7, 1950

2,499,521

UNITED STATES PATENT OFFICE 2,499,521

POT WELL SCRAPER

Hugh O. Morrison, Birmingham, Ala.

Application June 8, 1946, Serial No. 675,411

1 Claim. (Cl. 15—104.09)

My present invention relates to a scraper for removing dross from the pot wells of linotypes or other slug casting machines, and has for an object the provision of a scraper embodying scraper elements which are outwardly movable responsive to downward pressure on a rotatable handle with which they are associated, thus to contact the inner sides of the pot wall and remove the dross therefrom as the elements are rotated.

Another object of my invention is to provide a scraper of the character designated in which pressure applied to the walls of the pot during cleaning is determined by the downward pressure applied to the operating handle of the device.

A further object of my invention is to provide a scraper of the character designated embodying a pair of scraper blades pivotally connected at each end through links to upper and lower cross members, the upper cross member being fixed to an operating rod, and the lower one being secured to a tubular member within which the lower end of the rod slides, whereby, when the handle is pressed downwardly the blades are caused to move outwardly to contact the walls of the pot.

Apparatus embodying features of my invention is illustrated in the accompanying drawing, forming a part of this application, in which Fig. 1 is an elevational view with a portion of the operating rod broken away;

Fig. 2 is a side view of the device with the upper end of the rod and crank therefor broken away; and Fig. 3 is a view showing my device in use in cleaning a pot well.

Referring to the drawings for a better understanding of my invention, my improved scraper comprises an operating rod 10 having a crank 11 on the upper end thereof. Rotatably mounted on the rod beneath the crank 11 is a cylindrical grip member 12 which is held in place on the rod by means of collars 13 and 14, secured to the rod by rivets 16 and 17.

The lower end 18 of the rod slidably telescopes within the upper end of a short section of tube 19, while a separate section of rod 21 is secured in the lower end of the tube and projects therefrom. The tube 19 is provided at its upper end with a slot 22 within which are slidably positioned the projecting ends of a pin 23 carried by the rod 10.

Secured to the rod 10 by means of a pin 24 is an upper cross member 26, slotted at its ends as indicated at 27. A similar cross member 28, also provided with slots 27, is secured to the lower end of the tube 19 by a pin 29 passing through the tube and the projecting rod 21.

Pivotally mounted within each of the slots 27 in the upper and lower cross members on rivets 31 are links 32, the outer ends of which are slotted as indicated at 33. Pivotally mounted at each end on pins 34 within the slotted ends of links 32 are a pair of scraper blades 36 which are adapted to move outwardly into engagement with the inner wall of a pot well and scrape the same, as will now be explained.

From the foregoing the operation of my improved scraper will be readily understood. The blade end of the device is positioned in the pot well 37 to be cleaned with the lower end of rod 21 resting on the bottom 38 thereof. The rod 10 is now pressed downwardly by grasping the member 12 in one hand and the crank 11 in the other. Upon pressing downwardly on the rod, the lower end thereof slides farther into the tube 19, thus causing the pivotally mounted blades 36 to move outwardly into contact with the pot well walls, the links 32 pivoting on their pins 31. When the blades come in contact with the side walls of the pot well, they are rotated by means of the crank 11, it being noted that the pin 23 acting in the groove 22 of tube 19 serves to transmit the rotational force to the lower ends of the blades, while the rotational force for the upper ends thereof is transmitted directly to the cross member 26 through pin 24.

From the foregoing, it will be apparent that I have devised an improved pot well scraper which is simple of construction and operation, and one in which the blades are pressed into scraping contact against the pot well with a force limited only by the downward pressure applied to the operating rod 10. Further, since the blades are mounted on the pivoted links, the pressure applied forces the scraping edges thereof uniformly into contact with the pot wall from one end of the blade to the other, thus to effect complete cleaning of the entire pot wall. It will be noted that when the scraper is removed from the pot well, gravity causes the blades to return to contracted position.

While the molten metal in which the scraper is immersed when cleaning a pot well will stick thereto and freeze the device upon withdrawal, the metal readily melts from around the joints when the scraper is again immersed in the molten metal within the pot well.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claim.

What I claim is:

In a scraper for pot wells and the like, a rotatable operating rod having a scraper element adjacent the lower end comprising a pair of links pivotally connected at one end to the rod, a pair of scraper blades having substantially straight scraping edges and pivoted at one end to the other end of said links, said blades and rod lying generally in a common plane, a tube slidably surrounding the lower end of the rod, a second pair of links pivotally connected at one end to said tube and at the other end adjacent the opposite end of said blades, and means slidably and non-rotatably connecting the rod and tube together.

HUGH O. MORRISON.

REFERENCES CITED

The following references are of record in the file of this patent:

UNITED STATES PATENTS

| Number | Name | Date |
|---|---|---|
| 168,072 | Williams | Sept. 21, 1875 |
| 444,710 | McPherson | Jan. 13, 1891 |
| 1,014,236 | Lawhon | Jan. 9, 1912 |
| 1,577,544 | Sengele | Mar. 23, 1926 |
| 2,287,916 | Therrien | June 30, 1942 |